(12) United States Patent
Uehara (10) Patent No.: US 11,705,796 B2
(45) Date of Patent: Jul. 18, 2023

(54) ELECTRIC MOTOR

(71) Applicants: Sou, Inc., Sagamihara (JP); UGK, Inc., Sagamihara (JP)

(72) Inventor: Tadayoshi Uehara, Sagamihara (JP)

(73) Assignees: Sou, Inc.; UGK, Inc.

( * ) Notice: Subject to any disclaimer, the term of this patent is extended or adjusted under 35 U.S.C. 154(b) by 344 days.

(21) Appl. No.: 17/276,484

(22) PCT Filed: May 21, 2019

(86) PCT No.: PCT/JP2019/020087
§ 371 (c)(1),
(2) Date: Mar. 16, 2021

(87) PCT Pub. No.: WO2020/075334
PCT Pub. Date: Apr. 16, 2020

(65) Prior Publication Data
US 2022/0045588 A1 Feb. 10, 2022

(30) Foreign Application Priority Data

Oct. 9, 2018 (JP) ................ 2018-190625

(51) Int. Cl.
*H02K 21/10* (2006.01)
*H02K 7/08* (2006.01)

(52) U.S. Cl.
CPC ............. *H02K 21/10* (2013.01); *H02K 7/083* (2013.01)

(58) Field of Classification Search
CPC ............................... H02K 21/10; H02K 7/083
USPC ........................................................ 310/115
See application file for complete search history.

(56) References Cited

FOREIGN PATENT DOCUMENTS

| JP | S59-185135 A | 10/1984 |
| JP | H01-286750 A | 11/1989 |
| JP | 4438022 B | 3/2010 |
| JP | 4460629 B | 5/2010 |
| JP | 2010-284067 A | 12/2010 |

OTHER PUBLICATIONS

International Search Report for PCT/JP2019/020087 dated Aug. 20, 2019.
PCT written opinion dated Aug. 20, 2019.

*Primary Examiner* — Terrance L Kenerly
(74) *Attorney, Agent, or Firm* — Yokoi & Co., U.S.A.; Toshiyuki Yokoi (57) ABSTRACT

A stator of an electric motor is rotated and a rotational force of the stator is used for a rotation of a rotor. Thus, the electric motor capable of obtaining high output is provided. A stator 40 is rotated in electric motors 80a, 80b. When rotating a rotor 30, a rotational force of the stator 40 is used for a rotation of the rotor 30. Consequently, higher output can be obtained compared to the conventional electric motor. In addition, the rotational force of the rotor 30 is accumulated as the rotational force of the stator 40 as kinetic energy. In case of a restarting or the like, since the rotational force of the stator 40 is used for the rotation of the rotor 30 as the kinetic energy, the energy loss is small and the kinetic energy of the rotor 30 and the stator 40 can be efficiently used. In addition, in the operation area where the stator 40 is rotated, counter electromotive force Ke or inductive reactance XL applied to coils 42 is reduced. Consequently, the loss is suppressed and the supply power can be efficiently used.

7 Claims, 6 Drawing Sheets

ELECTRIC MOTOR

TECHNICAL FIELD

The present invention relates to an electric motor capable of obtaining high output by rotating a stator of the electric motor to use a rotational force of the stator for a rotation of a rotor.

BACKGROUND ART

In recent years, from the viewpoint of reducing carbon dioxide emission, hybrid vehicles using both internal combustion and electric motor and electric vehicles are spread remarkably. The above described hybrid vehicles and electric vehicles use an electric motor having a large output as a driving source for rotating wheels by electric power. Here, the inventor of the present invention and other members made an invention related to an electric motor capable of supplying a large current while preventing the occurrence of arc sparks as described in [Patent Document 1] and [Patent Document 2] below.

PRIOR ART DOCUMENTS

Patent Documents

Patent Document 1: Japanese Patent No. 4438022
Patent Document 2: Japanese Patent No. 4460629

DISCLOSURE OF THE INVENTION

Problems to be Solved by the Invention

However, higher efficiency and higher output are demanded and further improvement is desired for the above described electric motors. The present invention is made considering the above described situation and aims for providing an electric motor capable of obtaining high output by rotating a stator of the electric motor and using a rotational force of the stator for a rotation of a rotor.

Means for Solving the Problem (1) The present invention solves the above described problems by providing: electric motors 80a, 80b having: an output shaft 10 for transmitting a rotational force to a driven body M; a bearing portion 12 for supporting the output shaft 10 so as to be rotatable; a rotor 30 fixed to the output shaft 10; a stator 40 located outside the rotor 30; and a plurality of coils 42 provided on the stator 40, wherein the rotor 30 is configured to be rotated when a drive current flows through the plurality of coils 42, characterized in that the electric motors 80a, 80b further having: a stator rotating mechanism 46 for supporting the stator 40 so that the stator 40 is rotatable in a same direction as the rotor 30, and the drive current is made to flow in a state that the stator 40 is rotated so that the rotor is rotated by the rotational force of the stator 40 in addition to the rotational force generated by the drive current.

(2) The present invention solves the above described problems by providing the electric motors 80a, 80b described in (1) above characterized in that when the rotation of the stator 40 exceeds a limitation torque T0 of the rotor 30, the plurality of coils 42 of the stator 40 generates electric power by an amount exceeding the limitation torque T0 so that a part of the drive current is compensated by a current generated by the electric power to reduce the drive current.

(3) The present invention solves the above described problems by providing the electric motors 80a, 80b described in (1) above characterized in that the electric motors 80a, 80b further having: a reverse rotation preventing unit 16, 46b for preventing a reverse rotation of the rotor 30 and the stator 40, wherein the reverse rotation preventing unit 16, 46b includes: a ratchet gear 50 fixed to the bearing portion 12; and a hook portion 52 fixed to the rotor 30 and the stator 40 so as to be engaged with the ratchet gear 50, and the hook portion is configured to be separated from the ratchet gear 50 and not in contact with the ratchet gear 50 when the rotational speed exceeds a predetermined rotational speed.

(4) The present invention solves the above described problems by providing the electric motors 80a, 80b described in any one of (1) to (3) above characterized in that the drive current flowing through the plurality of coils 42 is an alternate current, the electric motors 80a, 80b further having: a rotor core 36 provided on the rotor 30; a stator frequency acquisition unit for acquiring a stator frequency fc from a number of rotation of the stator 40; and a controller for controlling a frequency fa of the drive current, and the controller controls the frequency fa so that the frequency fa becomes a predetermined slip frequency (fsa, −fsa) while the stator frequency fc is taken into consideration.

(5) The present invention solves the above described problems by providing the electric motors 80a, 80b described in any one of (1) to (3) above characterized in that the electric motors 80a, 80b further having: a plurality of field magnets 32 provided on the rotor 30 so that the plurality of field magnets 32 faces the plurality of coils 42; a position information acquisition unit for acquiring a relative position between the plurality of coils 42 and the plurality of field magnets 32; and a controller for controlling a flowing direction of the drive current flowing through the plurality of coils 42, wherein the plurality of field magnets 32 is arranged at equal intervals so that magnetic poles are opposite to each other between neighboring field magnets, the controller controls the flowing direction of the drive current flowing through the plurality of coils 42 based on the relative position between the plurality of coils 42 and the plurality of field magnets 32 acquired by the position information acquisition unit.

Effects of the Invention

In the electric motor of the present invention, when decelerating the rotor, for example, the stator is rotated by the rotational force of the rotor so that the rotational force of the rotor is accumulated as kinetic energy. When accelerating the rotor, the rotational force of the stator is used for the rotation of the rotor. Consequently, the rotational force of the stator is combined with the rotational force of the original drive current and high output can be obtained. In addition, since the rotational force is transmitted between the rotor and the stator as the kinetic energy, energy loss is small and the rotational force of the rotor and the stator can be efficiently used. Furthermore, in the electric motor of the present invention, counter electromotive force or inductive reactance generated on the coils can be reduced in the operation region where the rotational speed of the stator is faster than the rotational speed of the rotor. Thus, power loss can be suppressed in the above described operation region.

Furthermore, when there is excess torque on the rotational force of the stator, the coils generate the electric power by an amount corresponding to the excess torque. Thus, the output of the drive current can be reduced. Consequently, efficiency can be further increased and energy saving can be further achieved.

MODES FOR CARRYING OUT THE INVENTION

Figure 1:
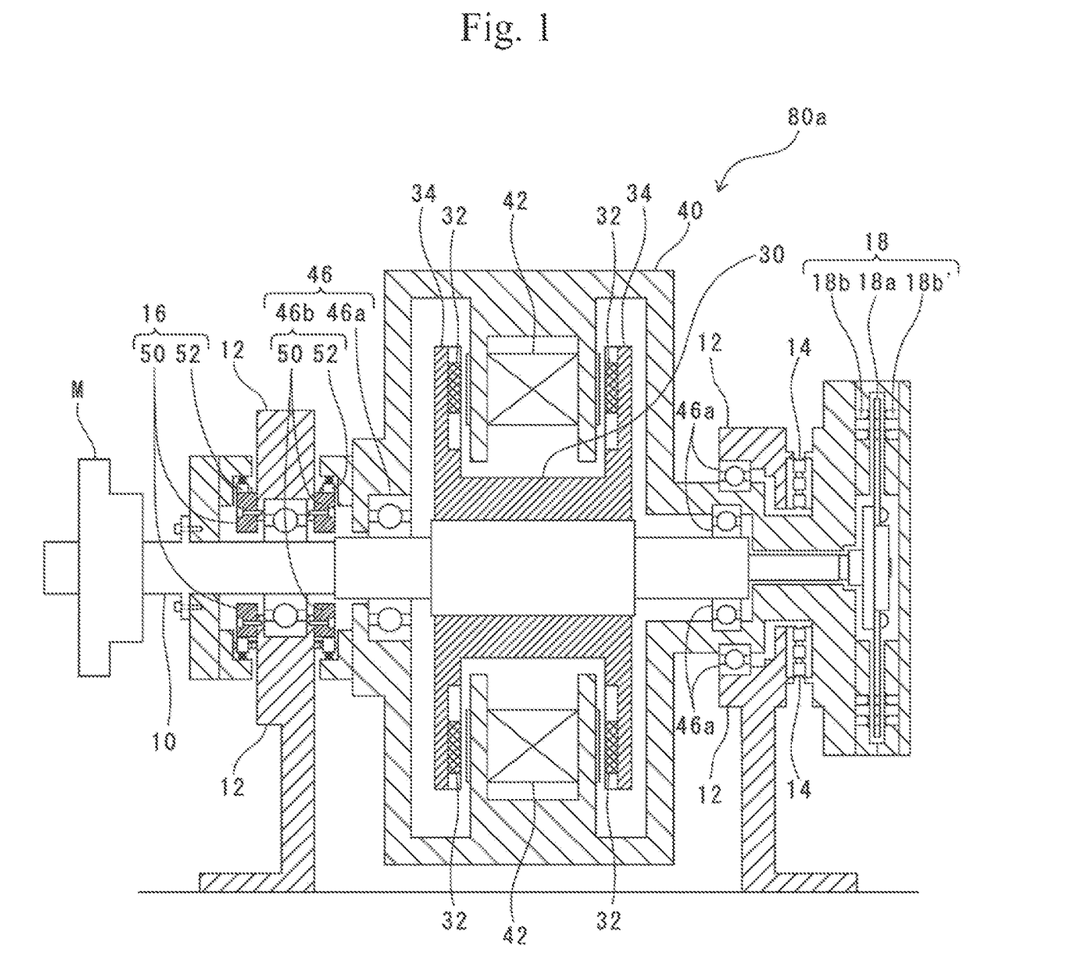
FIG. 1 is a schematic cross-sectional view of an electric motor concerning the first embodiment of the present invention.
Figure 2:
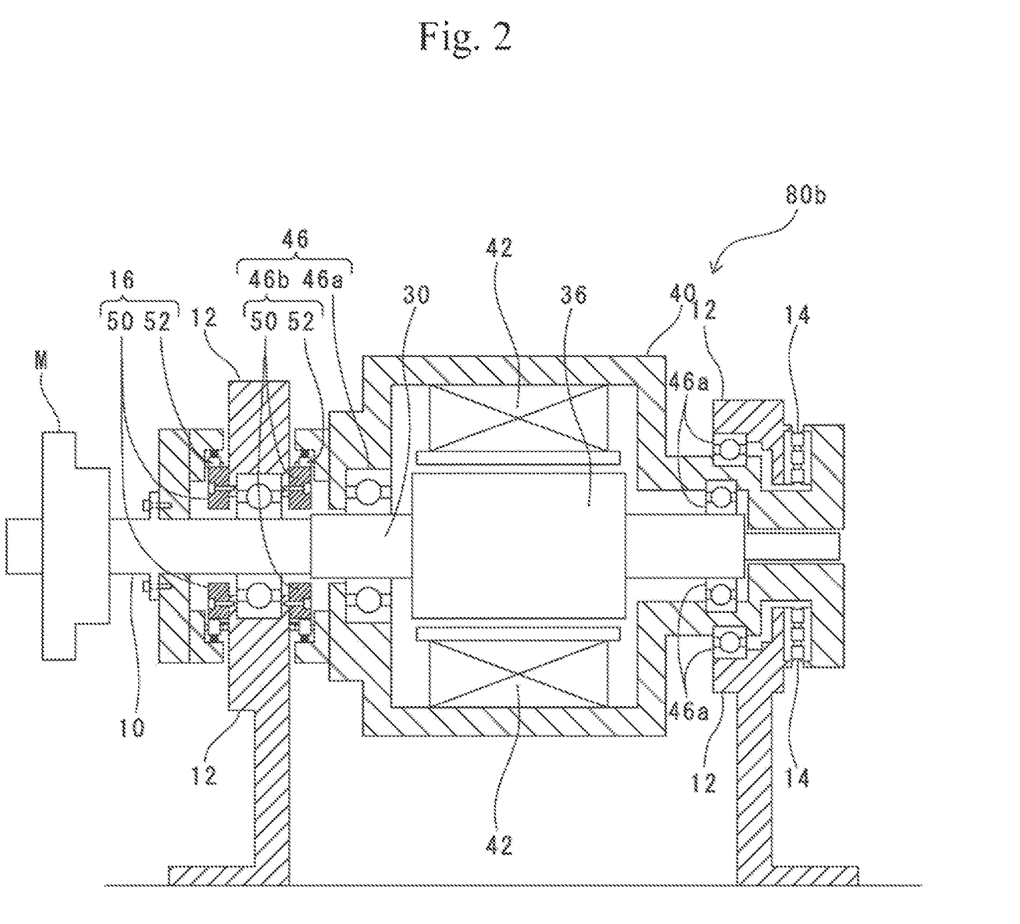
FIG. 2 is a schematic cross-sectional view of an electric motor concerning the second embodiment of the present invention.

The embodiments of the electric motor of the present invention will be explained based on the drawings. Here, FIG. 1 is a schematic cross-sectional view of an electric motor 80a concerning the first embodiment of the present invention. In addition, FIG. 2 is a schematic cross-sectional view of an electric motor 80b concerning the second embodiment of the present invention.

First, the configuration common for both the electric motors 80a, 80b will be explained. The electric motors 80a, 80b of the present invention shown in FIG. 1 and FIG. 2 have an output shaft 10 for transmitting a rotational force to a driven body M, a rotor 30 fixed to the output shaft 10, a stator 40 located outside the rotor 30, a stator rotating mechanism 46 for supporting the stator 40 so that the stator 40 is rotatable in the same direction as the rotor 30. When the electric motors 80a, 80b of the present invention are applied to vehicles such as an electric vehicle, the driven body M is a wheel or a deceleration mechanism for rotating the wheel, for example.

The rotor 30 (output shaft 10) is supported by a bearing portion 12 so as to be rotatable, and a reverse rotation preventing unit 16 is provided between the rotor 30 (output shaft 10) and the bearing portion 12 for restricting a reverse rotation of the rotor 30. When the driven body M is stopped, for example, the reverse rotation preventing unit 16 fixes the rotor 30 and the bearing portion 12 with each other for preventing the rotation of the rotor 30. In addition, the stator rotating mechanism 46 for supporting the stator 40 is mainly comprised of: a bearing portion 46a such as a conventionally known bearing for supporting the stator 40 so as to be rotatable with respect to the rotor 30; and a reverse rotation preventing unit 46b for preventing the stator 40 from rotating in a reverse direction of the rotation direction of the rotor 30. In addition, a conventionally known rotation body conducting means 14 such as a spring and a conductive brush is provided between the stator 40 and the bearing portion 12. The later described coils 42 and the like receive power supply from a power supply part via the rotation body conducting means 14.

Figure 3A:
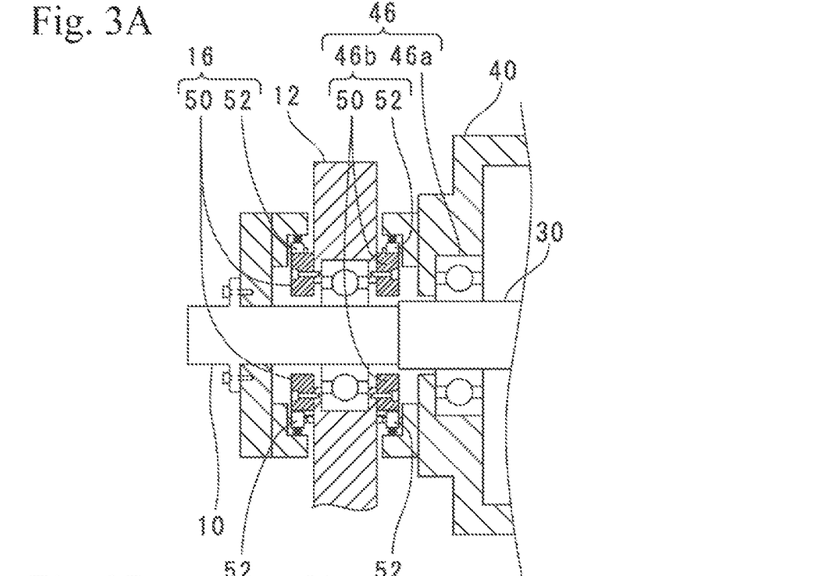
FIGS. 3A to 3C are drawings showing a reverse rotation preventing unit preferable for the present invention.
Figure 3B:
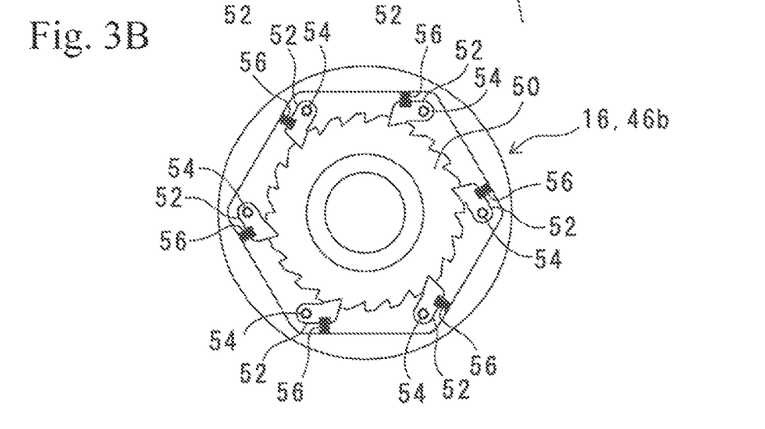
Figure 3C:
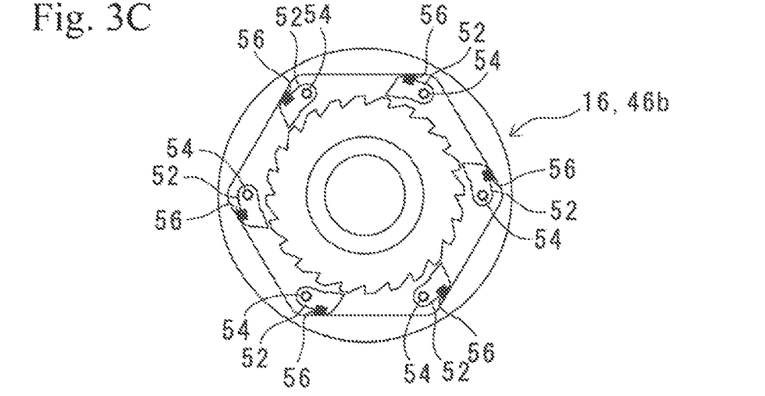

Although the conventionally known members such as a one-way clutch and an electromagnetic clutch can be used as the reverse rotation preventing units 16, 46b, the mechanism shown in FIGS. 3A to 3C is especially preferably used. Here, FIG. 3A is a schematic diagram of the reverse rotation preventing units 16, 46b preferably used for the present invention viewed from a lateral direction, FIG. 3B is a schematic diagram of the reverse rotation preventing units 16, 46b during low-speed rotation viewed from an axial direction, and FIG. 3C is a schematic diagram of the reverse rotation preventing units 16, 46b during high-speed rotation viewed from an axial direction.

As shown in FIGS. 3A to 3C, the reverse rotation preventing unit 16 preferably used for the rotor 30 has a ratchet gear 50 fixed to the bearing portion 12, hook portions 52 fixed to the rotor 30 side by being fixed to the output shaft 10, rotation shafts 54 for supporting the hook portions 52 so as to be pivotable, and conventionally known elastic members 56 such as a spring for energizing the hook portions 52 to the ratchet gear 50 side. In addition, the reverse rotation preventing unit 46b preferably used for the stator 40 has a ratchet gear 50 fixed to the bearing portion 12, hook portions 52 fixed to the stator 40 side, rotation shafts 54 for supporting the hook portions 52 so as to be pivotable, and conventionally known elastic members 56 such as a spring for energizing the hook portions 52 to the ratchet gear 50 side. Although FIGS. 3A to 3C show an example of including six hook portions 52, the number of the hook portions 52 is not particularly limited.

In the reverse rotation preventing units 16, 46b, when the force is applied to rotate the rotor 30 and the stator 40 in a forward direction (clockwise direction in FIGS. 3B, 3C) with respect to the bearing portion 12 (ratchet gear 50), the hook portions 52 rotate while sliding on the ratchet gear 50. Consequently, the reverse rotation preventing units 16, 46b allow the rotation of the rotor 30 and the stator 40 in the forward direction. In addition, when the force is applied to rotate the rotor 30 and the stator 40 in a reverse direction (counterclockwise direction in FIGS. 3B, 3C) with respect to the bearing portion 12, the hook portions 52 are engaged with the ratchet gear 50 to stop the ratchet gear 50. Thus, the reverse rotation preventing units 16, 46b prevent a reverse rotation of the rotor 30 and the stator 40. In the reverse rotation preventing units 16, 46b particularly preferably used for the present invention, the elastic force of the elastic members 56 is optimized so that the hook portions 52 are pivoted outward by centrifugal force when the rotational speed of the rotor 30 and the stator 40 exceeds a predetermined rotational speed (i.e., high speed rotation). In the above described configuration, when the rotor 30 and the stator 40 are in a state of the high speed rotation, as shown in FIG. 3C, the hook portions 52 are pivoted and separated from the ratchet gear 50 and not in contact with the ratchet gear 50. Consequently, frictional resistance and vibration are reduced. Thus, reduction of loss can be expected. In addition, the friction and load applied to the reverse rotation preventing units 16, 46b are reduced. Thus, life prolongation of the reverse rotation preventing units 16, 46b can be expected.

Next, the configuration of the electric motor 80a concerning the first embodiment of the present invention will be explained. The electric motor 80a of the first embodiment shown in FIG. 1 has a plurality of coils 42 on the stator 40 side to function as an armature and a plurality of field magnets 32 on the rotor 30 side to function as a field portion. As described later, the rotational force Ki of the stator 40 is converted into the rotation of the rotor 30 in the present invention. At this time, the rotational force Ki of the stator 40 increases depending on the moment of inertia of the stator 40. Accordingly, in order to obtain larger rotational force Ki, it is effective to increase the weight of the stator 40 to increase the moment of inertia. Thus, it is preferable to provide the coils 42 on the stator 40 side to increase the moment of inertia in the electric motor 80*a* of the first embodiment since the coils 42 are heavy.

The coils 42 of the stator 40 have a magnetic core as a core. A plurality of coils (e.g., 36 coils) is arranged at regular intervals in a circumferential direction. In addition, two rotor disks 34 are fixed to the rotor 30 of the electric motor 80*a* to sandwich the coils 42 located at the stator 40 side. A plurality of field magnets 32 is fixed to the inside of the rotor disks 34 at equal intervals so that the field magnets 32 face the magnetic cores of the coils 42 located at the stator 40 side. Note that the field magnets 32 are permanent magnets for forming field fluxes with respect to the coils 42 to rotate the rotor 30 so that magnetic poles are opposite to each other (i.e., N pole and S pole alternately appear) between the neighboring magnets in a circumferential direction. In addition, although metal magnets and sintered magnets can be used as the field magnets 32, it is particularly preferable to use rare earth magnets such as a neodymium magnet since they have large magnetic force. When the number of the coils 42 is 36, six pairs of field magnets 32 are provided to sandwich the coils 42, for example.

In addition, the electric motor 80*a* is provided with a position information acquisition unit 18 for acquiring a relative position of the field magnets 32 with respect to the coils 42 and a not-illustrated controller for inputting the number of rotation of the output shaft 10 (rotor 30) and controlling a flowing direction of the drive current flowing through the coils 42 based on the position information input from the position information acquisition unit 18. Note that the position information acquisition unit 18 is not particularly limited. Conventionally known magnetic position detectors such as a conventionally known position sensor, resolver type angle measuring device and conventionally known optical position detectors and any other devices can be used for the position information acquisition unit 18.

In addition to the position information acquisition unit 18 for directly acquiring the relative position, it is also possible that coil position information acquisition units for acquiring the absolute position of the coils 42 and magnet position information acquisition units for acquiring the absolute position of the field magnets 32 are individually provided, the output of each of the coil position information acquisition units is connected with a port-1 of the controller (CPU), for example, and the output of each of the magnet position information acquisition units is connected with a port-2, for example, the controller acquires the absolute position of the coils 42 from the input signals of the port-1 and acquires the absolute position of the field magnets 32 from the input signals of the port-2, and the relative positon between the field magnets 32 and the coils 42 is calculated from the absolute position of the coils 42 and the absolute position of the field magnets 32.

As the position information acquisition unit 18, FIG. 1 shows an example using an optical position detection means having a slit plate 18*a* which is rotated together with the rotor 30 and provided with an opening at a predetermined position, a light emitting element 18*b* and a light receiving element 18*b*' which is fixed to the stator 40 and arranged sandwiching the opening of the slit plate 18*a*. In the above described position information acquisition unit 18, when the rotor 30 and the stator 40 are rotated and the opening of the slit plate 18*a* is located at the position between the light emitting element 18*b* and the light receiving element 18*b*', the light of the light emitting element 18*b* reaches the light receiving element 18*b*' via the opening of the slit plate 18*a* and the light receiving element 18*b*' outputs a predetermined light receiving signal to the later described controller or the like. In addition, when the opening of the slit plate 18*a* is displaced from the position between the light emitting element 18*b* and the light receiving element 18*b*', the light of the light emitting element 18*b* is shielded by the slit plate 18*a*. Thus, the light of the light emitting element 18*b* does not reach the light receiving element 18*b*' and the light receiving signal is not outputted. Thus, the controller can acquire the relative position between the coils 42 and the field magnets 32 based on the inputted light receiving signal by optimizing the position of the opening of the slit plate 18*a*. Thus, the controller controls the current value and the flowing direction of the drive current flowing through each of the coils 42 so that the rotation motion demanded by upper devices such as a controller based on the relative position of the rotor 30 (field magnets 32) with respect to the stator 40 (coils 42) and the number of rotation of the output shaft 10 (rotor 30).

Next, the configuration of the electric motor 80*b* concerning the second embodiment of the present invention will be explained. First, the rotor 30 of the electric motor 80*b* has a rotor core 36 formed by bonding magnetic steel sheets in a cylindrical shape, for example. A plurality of coils 42 having a magnetic core is arranged inside the stator 40 facing the rotor core 36 so that the magnetic core faces the rotor core 36 side. In case of a three-phase AC electric motor 80*b* including U-phase, V-phase and W-phase, for example, the coils 42 corresponding respectively to the U-phase, the V-phase and the W-phase are sequentially arranged. Thus, the magnetic field formed by the coils 42 is rotated when the alternating current of the U-phase, the V-phase and the W-phase flows through each of the coils 42 sequentially. Thus, eddy current flows through the rotor core 36 by the rotating magnetic field and Lorentz force is generated to rotate the rotor 30.

In addition, the above described electric motor 80*b* of the second embodiment has a stator frequency acquisition unit for calculating a stator frequency fc corresponding to the number of rotation of the stator 40 or selecting and acquiring the stator frequency fc from a data table or the like, and a controller for controlling a frequency fa of the drive current flowing through each of the coils 42. Note that the stator frequency fc means the frequency of the drive current required for generating the rotating magnetic field having the same number of rotation as the rotation of the stator 40 in the stator 40 (in a state that the stator 40 is stopped). The controller controls the frequency fa so that the rotating magnetic field applied to the rotor 30 becomes a slip frequency fs while the stator frequency fc is taken into consideration.

Figure 4A:
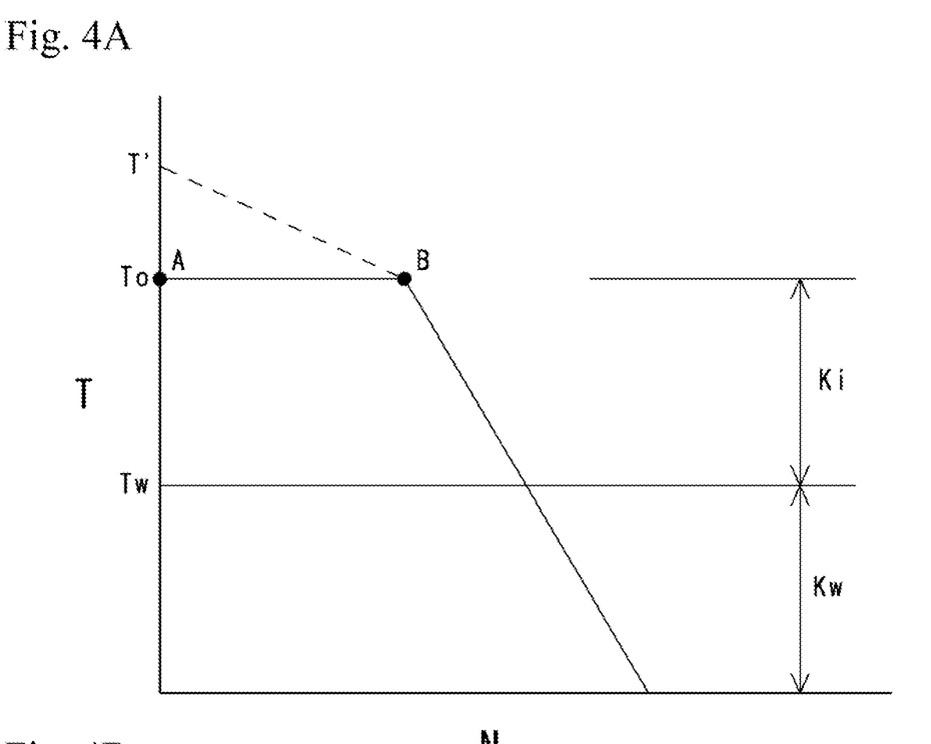
FIGS. 4A and 4B are drawings schematically showing an N-T curve and change in the rotational speed of the electric motor of the present invention.
Figure 4B:
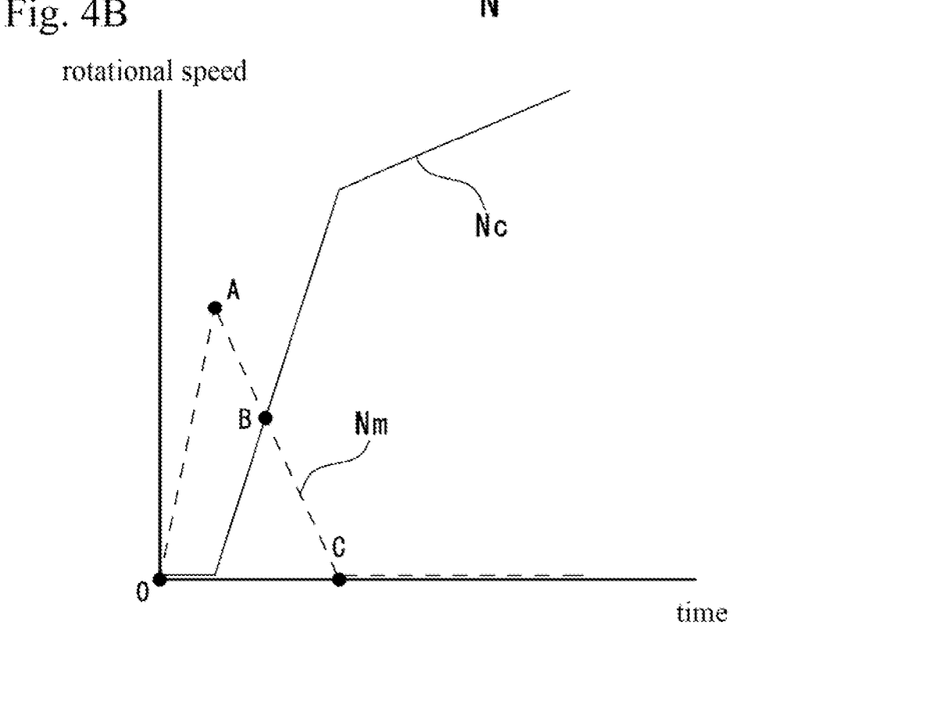

Next, characteristic operation of the electric motors 80*a*, 80*b* of the present invention will be explained by using FIGS. 4A and 4B. Here, FIG. 4A is an N-T curve schematically showing the number of rotation N of the output shaft 10 as a horizontal axis and a torque T of the output shaft 10 as a vertical axis, and FIG. 4B is a drawing schematically showing the change in the rotational speed of the rotor 30 and the stator 40 by straight lines for explaining the change in the rotational speed. Note that FIG. 4A shows the configuration of limiting the upper limit torque of the rotor 30 by torque T0. In this case, in the area shown by the broken line in FIG. 4A where the torque T of the output shaft 10 exceeds the limitation torque T0, the coils 42 generate electric power by excessive torque to compensate a part of the drive current as described later. Consequently, the output of the drive current can be reduced and energy saving can be achieved.

First, when the power source of the electric motor 80a of the first embodiment is turned off, both the rotor 30 and the stator 40 of the electric motor 80a are in the stopped state (point O in FIG. 4B). Then, when the electric motor 80a is turned on, the controller applies electric current to the coils 42 in a reverse rotational direction in a state that the reverse rotation of the rotor 30 is prevented by the reverse rotation preventing unit 16. Consequently, although the force is applied to the rotor 30 in the reverse rotational direction, the reverse rotation of the rotor 30 is prevented as described above. Thus, the force generated at the rotor 30 is applied to the stator 40 as a reaction force, and the stator 40 is rotated in the forward direction. When the output request to the output shaft 10 is inputted (e.g., accelerator is operated) in a state that the stator 40 reaches the predetermined rotational speed (point A on the broken line in FIG. 4B), the controller releases the fixing of the rotor 30 and makes the drive current flow through the coils 42 so that the rotor 30 is rotated in the forward direction. Consequently, the rotor 30 and the stator 40 magnetically connected with each other, and the rotor 30 starts to rotate in the same direction (forward direction) as the stator 40 by both the physical rotational force of the stator 40 and the drive current.

Here, an example of the control for controlling the flowing direction of the drive current of the electric motor 80a by the controller will be explained. Note that the explanation will be made here by using the electric motor 80a having nine coils 42 (coils CL1 to CL9 in FIGS. 5A to 5F) and six field magnets 32 (field magnets PM1 to PM6 shown in FIGS. 5A to 5F) as shown in FIGS. 5A to 5F. In this case, the field magnets PM1 to PM6 are provided at equal intervals with the angle of 60° and neighboring magnetic poles are opposite to each other. In addition, all of the magnetic poles are opposite at a reverse surface of the surface shown in FIGS. 5A to 5F. Although the coils CL1 to CL9 (stator 40) are shown without being rotated in FIGS. 5A to 5F for the continence of the explanation, the stator 40 is also rotated in the forward direction same as the rotor 30 in actual.

Figure 5A:
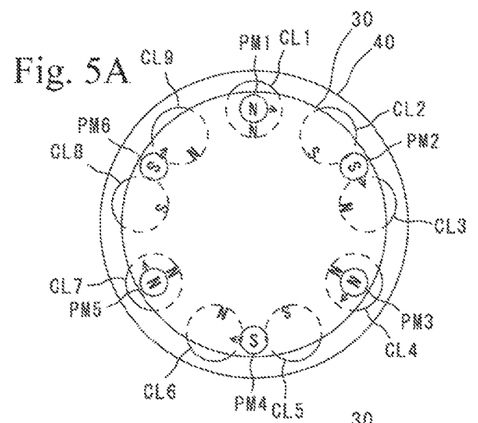
FIGS. 5A to 5F are drawings for explaining the control of the electric motor of the first embodiment.

From the information of the relative position between the coils 42 and the field magnets 32 acquired from the position information acquisition unit, when the above described controller of the electric motor 80a determines that the current state is, for example, a state shown in FIG. 5A, i.e., the magnetic poles (of the coils 42 side) are aligned between the field magnets PM1, PM3, PM5 of the N pole and the coils CL1, CL4, CL7 respectively, the controller switches the flowing direction of the drive current so that the magnetic poles of the coils CL1, CL4, CL7 (of the field magnets PM1, PM3, PM5 side) are changed from the S pole to the N pole. Consequently, repulsive force is generated between the field magnets PM1, PM3, PM5 and the coils CL1, CL4, CL7. At this time, since the magnetic poles of the coils CL3, CL6, CL9 which are located in the forward direction (clockwise direction in FIGS. 5A to 5F) of the field magnets PM2, PM4 and PM6 having the counter magnetic poles of S poles are N poles and the magnetic poles of the coils CL2, CL5, CL8 located in the reverse direction (counterclockwise direction shown in FIGS. 5A to 5F) are S poles, the field magnets PM2, PM4, PM6 are attracted to the coils CL3, CL6, CL9 having different polarities and the rotor 30 is rotated in the forward direction with respect to the stator 40.

Figure 5B:
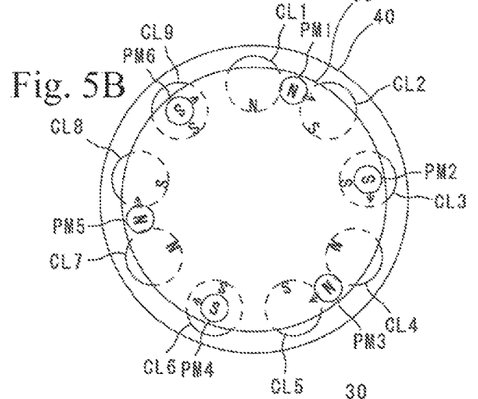
Figure 5C:
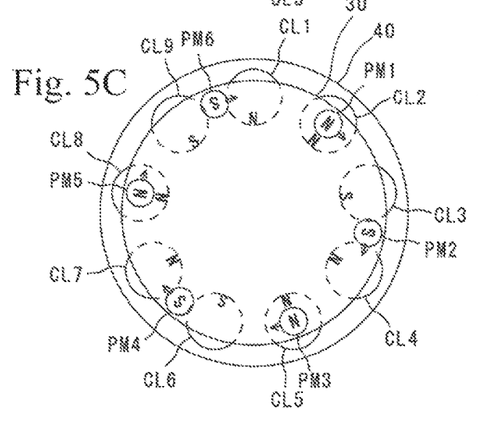
Figure 5D:
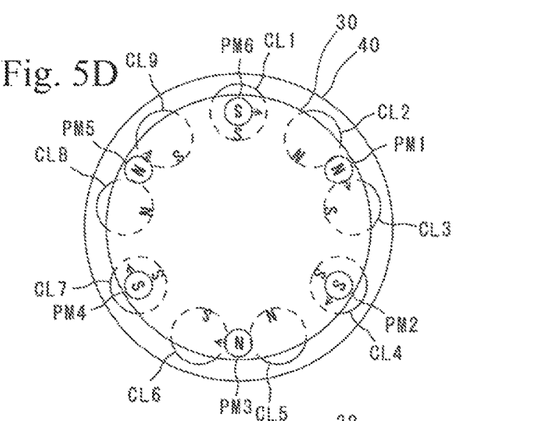
Figure 5E:
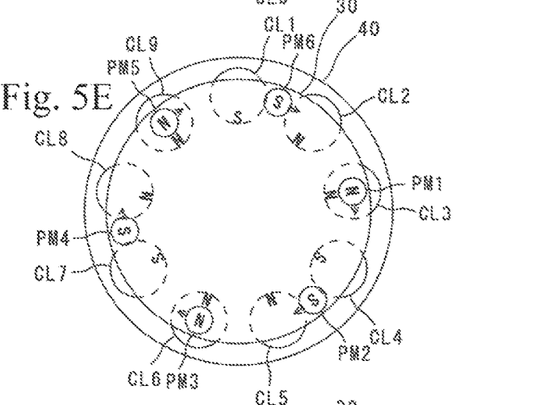
Figure 5F:
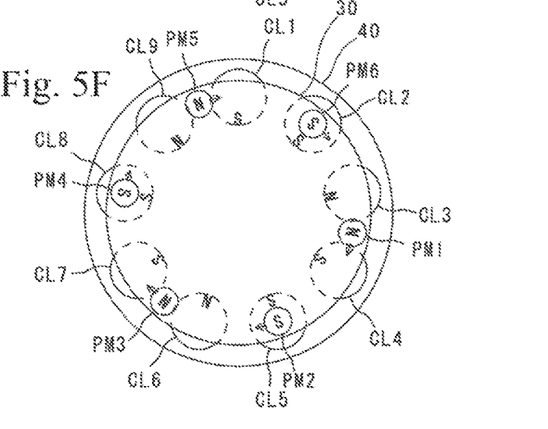

When the field magnets PM2, PM4, PM6 having the S pole are rotated to the positon aligned with the coils CL3, CL6, CL9 as shown in FIG. 5B, the controller detects this via the position information acquisition unit and switches the flowing direction of the drive current so that the magnetic poles of the coils CL3, CL6, CL9 are changed from the N pole to the S pole. Consequently, repulsive force is generated between the field magnets PM2, PM4, PM6 and the coils CL3, CL6, CL9. At this time, since the magnetic poles of the coils CL2, CL5, CL8 which are located in the forward direction of the field magnets PM1, PM3, PM5 of N poles are S poles and the magnetic poles of the coils CL1, CL4, CL7 located in the reverse direction are N poles, the field magnets PM1, PM3 and PM5 are attracted to the coils CL2, CL5, CL8 having different polarities and the rotor 30 is rotated in the forward direction with respect to the stator 40. As shown in FIGS. 5C to 5F, the controller changes the magnetic poles of the coils 42 by controlling the flowing direction of the drive current flowing through each of the coils 42 in accordance with the relative position between the coils 42 and the field magnets 32. Thus, the rotor 30 is rotated in the forward direction. Note that the current value of the drive current is arbitrarily specified by the controller based on the rotational speed and the torque required for the output shaft 10.

Consequently, the rotor 30 is rotated by the torque Tw in accordance with a supply power Kw of the drive current shown in FIG. 4A. In addition, as described above, the rotor 30 is rotated also by the rotational force of the stator 40. Thus, as shown in the point A of FIG. 4A, the rotor 30 is rotated by the torque T0 which is obtained by adding the torque generated by the rotational force Ki of the stator 40 to the torque Tw generated by the supply power Kw of the drive current. Note that the torque of the rotor 30 is limited to the torque T0 in FIG. 4A as described above. In this case, when the rotation of the rotor 30 is started, the rotor 30 is rotated mainly by the rotational force Ki of the stator 40. At this time, when there is excess torque on the rotational force of the stator 40, the coils 42 generate electric power by an amount corresponding to the excess torque. At this time, the relative rotational direction of the stator 40 (speed is decreased) viewed from the rotor 30 side (speed is increased) is opposite and the magnetic field direction is same. Thus, the flowing direction of the generated current and the flowing direction of the drive current are same from Fleming's right-hand rule and left-hand rule. Accordingly, the current generated by the coils 42 is combined with the drive current and compensated as a part of the drive current. Thus, the output of the drive current is reduced by that amount and the supply power from the power source can be reduced.

Alternatively, in the electric motor 80b of the second embodiment, when the electric motor 80b is turned on from a state that both the rotor 30 and the stator 40 are in the stopped state, the controller applies the alternating current of the reverse rotational direction of the U-phase, the V-phase and the W-phase to the coils 42 respectively in a state that the reverse rotation of the rotor 30 is prevented. Consequently, although the force of the reverse rotational direction is applied to the rotor 30, since the reverse rotation of the rotor 30 is prevented as described above, the force generated at the rotor 30 is applied to the stator 40 as a reaction force. Thus, the stator 40 is rotated in the forward direction. At this time, the stator frequency acquisition unit acquires the stator frequency fc in accordance with the number of rotation of the stator 40 and outputs the stator frequency fc to the controller. When the output request to the output shaft 10 is inputted (e.g., accelerator is operated) in a state that the stator 40 reaches the predetermined rotational speed (point A on the broken line in FIG. 4B), the controller releases the fixing of the rotor 30 and makes the drive current of the alternating current of the U-phase, the V-phase and the W-phase flow through the coils 42 so that the rotor 30 is rotated in the forward direction. At this time, the controller controls the frequency fa of the alternating current of the U-phase, the V-phase and the W-phase to have the slip frequency fs while the stator frequency fc is taken into consideration. Note that the slip frequency fs means the difference between a rotor frequency fn obtained from the number of rotation of the rotor 30 and a rotating magnetic field frequency fm applied to the rotor 30.

$$fs=fm-fn$$

In addition, the rotating magnetic field frequency fm in the electric motor 80b is the sum of the stator frequency fc generated by the rotation of the stator 40 and the frequency fa of the drive current.

$$fm=fc+fa$$

Figure 6:
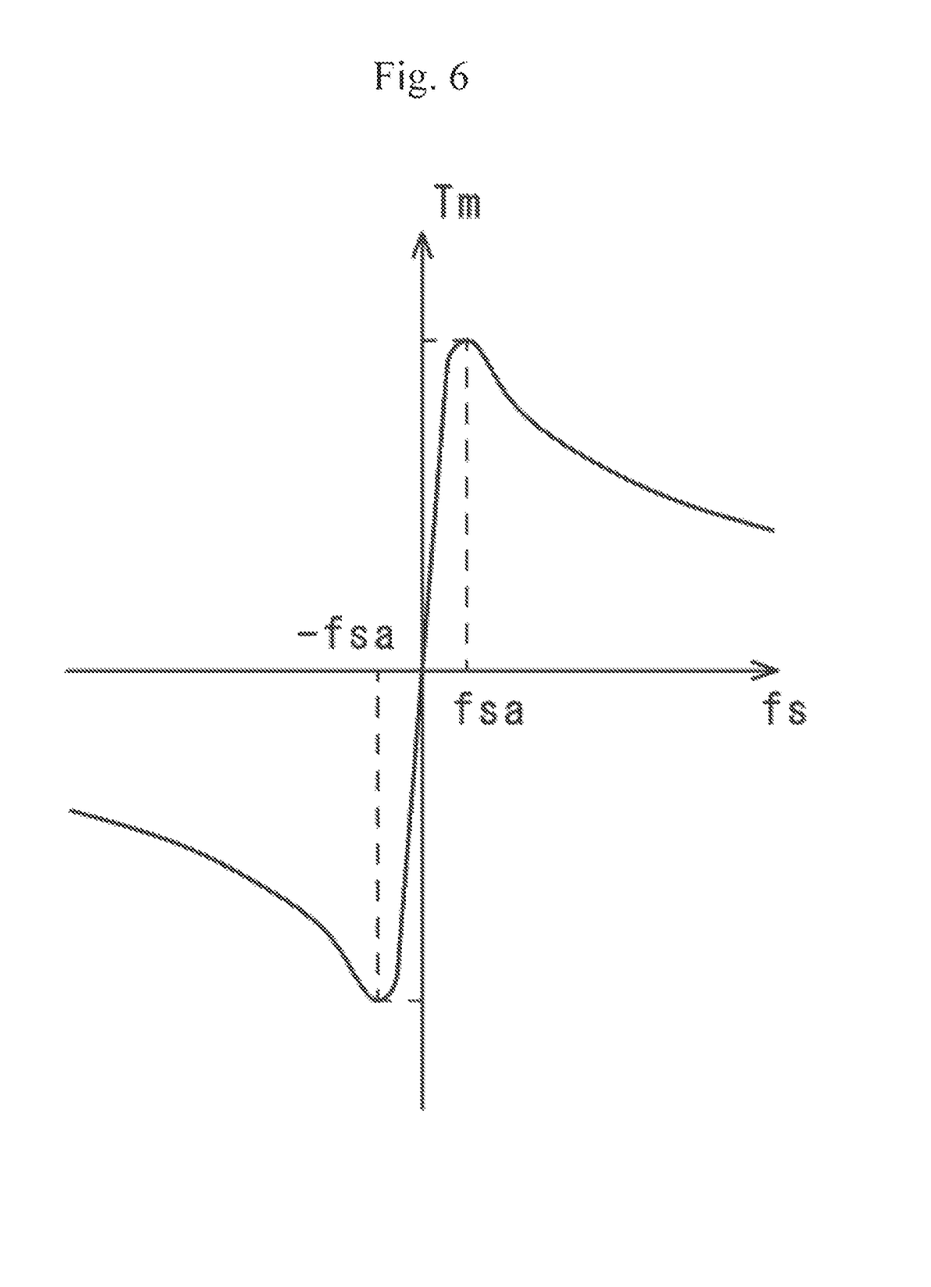
FIG. 6 is a graph showing the relation between a slip frequency and an electromagnetic torque.

Here, the relation between the slip frequency fs and the electromagnetic torque Tm is shown in FIG. 6. As shown in FIG. 6, the absolute value of the electromagnetic torque Tm shows positive and negative peak values when the slip frequency fs is a predetermined frequencies fsa, −fsa, and then the absolute value is reduced because of deterioration of power factor. In the electric motor 80b of the second embodiment, when increasing (accelerating) the rotational speed of the rotor 30, the frequency fa is controlled so that the slip frequency fs becomes the frequency fsa while the stator frequency fc is taken into consideration.

In addition, when reducing (decelerating) the rotational speed of the rotor 30, the frequency fa is controlled so that the slip frequency fs becomes the frequency −fsa while the stator frequency fc is taken into consideration. Note that the value of a slip ratio s (s=fsa/fm) in the slip frequencies fsa, −fsa is normally approximately 0.3±0.05.

Here, when the rotor 30 and the stator 40 are magnetically connected with each other in a state that the stator 40 is rotated at high speed of the rotational speed Nc' (stator frequency fc) in the forward direction, for example, the controller applies the drive current having the frequency fa=fn+fsa−fc so that the rotating magnetic field becomes the reverse rotation of the rotation of the stator 40. Consequently, the stator 40 generates the rotating magnetic field having the slip frequency fsa with respect to the rotor 30 while the stator 40 rotates at the rotational speed Nc'. Consequently, the rotor 30 is rotated by the rotating magnetic field having the maximum electromagnetic torque Tm. At the same time, the controller makes the direct current flow so as to be superimposed on the drive current to a degree of not obstructing the motion of the electric motor 80b. Consequently, the rotor 30 and the stator 40 are magnetically connected with each other and the rotor 30 is rotated in the same direction (forward direction) also by the physical rotational force of the stator 40. Namely, same as the above described electric motor 80a, the rotor 30 is rotated by the torque T0 which is obtained by adding the torque generated by the rotational force Ki of the stator 40 to the torque Tw (=electromagnetic torque Tm) generated by the supply power Kw of the drive current. Of course, the controller changes the frequency fa in accordance with the change of the rotational speed of the rotor 30 and the stator 40 to keep the slip frequency fsa.

At this time, when there is excess torque on the rotational force of the stator 40, the coils 42 generate electric power by an amount corresponding to the excess torque. At this time, same as the electric motor 80a of the first embodiment, the relative rotational direction of the stator 40 (speed is decreased) viewed from the rotor 30 side (speed is increased) is opposite and the magnetic field direction is same. Thus, the flowing direction of the generated current and the flowing direction of the drive current are same from Fleming's right-hand rule and left-hand rule. In addition, the frequency of the generated current is in proportion to the number of rotation of the stator 40 and equal to the drive current. Thus, the generated current is combined with the drive current and compensated as a part of the drive current. Consequently, the output of the drive current can be reduced and the supply power from the power source can be reduced.

As explained above, the rotor 30 of the electric motors 80a, 80b of the first embodiment and the second embodiment starts to rotate by the torque T0 generated by the rotational force of the stator 40 and the drive current. Here, when a virtual torque generated by the rotational force Ki and not limited by the torque T0 is shown as the torque T' in FIG. 4A, the torque T' is reduced in accordance with the rotation of the rotor 30 and the amount of the compensation of the drive current from the stator 40 side is also reduced by that amount. In addition, since the rotational force Ki of the stator 40 is used for the rotation of the rotor 30, the rotational speed Nm of the stator 40 shown as the broken line in FIG. 4B is reduced and the rotational speed Nc of the rotor 30 shown as the solid line in FIG. 4B is increased. The rotational speed Nm of the stator 40 and the rotational speed Nc of the rotor 30 are equal at a predetermined point B, and then the rotational speed Nc of the rotor 30 is faster than the rotational speed Nm of the stator 40. Note that FIG. 4A shows an example of locating the torque T0 at the point B where Nm=Nc.

Here, in the conventional electric motor where the stator is not rotated, counter electromotive force Ke is immediately generated when the rotor is rotated and the counter electromotive force Ke reduces the output Nc*T of the rotor as shown in the following formula A.

$$Nc*T=Kw-Ke \qquad \text{formula A}$$

Nc: number of rotation of output shaft (rotor)
T: output shaft torque
Kw: supply power
Ke: counter electromotive force In addition, the counter electromotive force Ke is shown by the following formula B.

$$Ke=B*L*r*\omega \qquad \text{formula B}$$

B: intensity of magnetic field
L: length of coils
r: radius of rotation
ω: angular velocity of rotor (with respect to stator)

As shown in the formula B, the counter electromotive force Ke increases as the angular velocity ω of the rotor with respect to the stator increases. Consequently, the output Nc*T shown in the formula A decreases and the loss increases. Accordingly, in the conventional electric motor where the stator is fixed, a large supply power Kw is required for compensating the loss caused by the counter electromotive force Ke and maintaining the predetermined output Nc*T.

However, in the electric motor 80a of the first embodiment of the present invention, the angular velocity ω of the rotor 30 with respect to the stator 40 is negative at the area (area between point A and point B in FIG. 4B) where the rotational speed Nm of the stator 40 is faster than the rotational speed Nc of the rotor 30 (Nm>Nc). Thus, the counter electromotive force Ke makes the current flow to compensate the drive current. Consequently, the supply power from the power source can be further reduced.

In the electric motor 80a of the first embodiment of the present invention, the counter electromotive force Ke is not generated until the rotational speed Nm of the stator 40 becomes equal to the rotational speed Nc of the rotor 30 (Nm=Nc) (point B in FIG. 4B), and all of the supply power Kw can be used for the output Nc*T of the rotor 30. Then, the counter electromotive force Ke is generated and loss of the output Nc*T is generated for the first time when the rotational speed Nc of the rotor 30 becomes faster than the rotational speed Nm of the stator 40 (Nc>Nm). Namely, although the loss caused by the counter electromotive force Ke is generated immediately after the rotor is rotated in the conventional electric motor where the stator is not rotated, the loss caused by the counter electromotive force Ke is not generated until the rotational speed Nc of the rotor 30 exceeds the rotational speed Nm of the stator 40 in the electric motor 80a of the present invention. Therefore, the output Nc*T can be maintained without increasing the supply power Kw at the early stage of the rotation of the rotor 30 where high torque is required.

Then, when the rotational speed Nc of the rotor 30 is further increased, the rotational speed Nm of the stator 40 is reduced and the stator 40 is finally stopped (point C in FIG. 4B). In the area of Nc>Nm>0 before the stator 40 is stopped (area between point B and point C in FIG. 4B), the stator 40 is still in a rotated state although the counter electromotive force Ke is generated. Thus, the counter electromotive force Ke becomes smaller by an amount of the rotational speed Nm of the stator 40. Therefore, the counter electromotive force Ke is smaller and the loss is smaller compared to the conventional electric motor where the stator is not rotated. After the point C shown in FIG. 4B where the stator 40 is stopped, the electric motor 80a of the first embodiment of the present invention shows similar behavior as the conventional electric motor.

As described above, since the electric motor 80a of the first embodiment of the present invention uses the rotational force Ki of the stator 40 for the rotation of the rotor 30, the rotor 30 can be rotated by the torque T0 which is higher than the torque Tw generated only by the supply power Kw in the conventional method. Here, when the torque T0 is twice as much as the torque Tw, at the area where the rotational speed Nm of the stator 40 is equal to the rotational speed Nc of the rotor 30 (Nm=Nc), the stator is not rotated and the rotor 30 is rotated only by the supply power Kw. Thus, as a result calculation, the output N*T which is four times larger can be obtained compared to the conventional electric motor where the loss is generated by the counter electromotive force Ke.

In addition, regarding the electric motor 80b of the second embodiment, in the conventional three-phase AC electric motor, self-induced electromotive force is generated on the coils in the direction opposite to the drive current (voltage) and inductive reactance XL at that time can be shown by the following formula C.

$$XL = 2\pi \cdot f \cdot LC \qquad \text{formula C}$$

Lc: inductance of coils
Here, f=ω/(2π)
ω: angular velocity of rotor (with respect to stator)
The loss increases and the output Nc*T decreases as the inductive reactance XL increases similar to the counter electromotive force Ke.

However, in the electric motor 80b of the second embodiment of the present invention, the rotor 30 is rotated mainly by the rotational force Ki of the stator 40 when the rotation of the rotor 30 is started and then the frequency f (frequency fa) to be applied is controlled until the stator 40 is stopped while the stator frequency fc is taken into consideration. Thus, ω is smaller and the frequency f to be applied can be reduced compared to the conventional electric motor where the stator is not rotated. Consequently, the inductive reactance XL can be kept low and the loss can be suppressed.

Then, in a state that the rotor 30 is rotated and the stator 40 is stopped in the electric motors 80a, 80b, when the request of reducing the rotational speed of the output shaft 10 (rotor 30) is inputted (e.g., brake is operated), the controller makes the drive current flow through the coils 42 so that the rotational speed of the rotor 30 is reduced, for example.

Consequently, the rotational speed of the rotor 30 is reduced and the reaction force is generated between the rotor 30 and the stator 40 simultaneously. Thus, the reaction force makes the stator 40 rotate in the forward direction. As a result, the rotational force of the rotor 30 is converted into the rotation of the stator 40 and accumulated. When the output request to rotate the output shaft 10 in the forward direction is inputted again (e.g., accelerator is operated), the rotational force Ki of the stator 40 is generated so that the rotor 30 is rotated similar to the above described operation.

Here, in an electric vehicle or the like having the conventional electric motor where the stator is not rotated, electric power is generated by the torque during the braking or the like and the electric power is accumulated in a battery or the like. The electric power is used as the supply power when restarting the vehicle (when the output request to rotate the output shaft 10 in the forward direction is inputted). However, the conversion efficiency from the kinetic energy to the electric energy is low and the energy loss is large. On the other hand, in the electric motors 80a, 80b of the present invention, the rotational force of the rotor 30 is accumulated as the rotational force of the stator 40 as the kinetic energy. Thus, the rotational force of the stator 40 can be used as the rotational force of the rotor 30 as the kinetic energy when restarting the vehicle. Therefore, the energy loss is small and the kinetic energy of the rotor 30 and the stator 40 can be efficiently used at the maximum.

In addition, especially in the electric motor 80b of the second embodiment, the frequency fa of the drive current applied to the rotor 30 is controlled so that the frequency fa becomes the slip frequency −fsa so that the maximum electromagnetic torque is generated in the reverse direction while the stator frequency fc of the stator 40 is taken into consideration also when the rotational speed of the rotor 30 is reduced (where the number of rotation is gradually increased). For example, when the rotor 30 and the stator 40 are magnetically connected with each other in a state that the rotor 30 is rotated in the forward direction at high speed of the number of rotation Nn' (rotor frequency fn), the controller applies the drive current having the frequency fa to the rotor 30 to generate the rotating magnetic field having the slip frequency of −fsa (in an opposite direction of the rotating direction of the rotor 30). In addition, the controller simultaneously makes the direct current flow so as to be superimposed on the drive current to a degree of not obstructing the motion of the electric motor 80b. Consequently, the stator 40 is magnetically connected with the rotor 30 and the rotational speed is gradually increased by the rotating magnetic field having the slip frequency of −fsa where the electromagnetic torque Tm becomes the maximum in the opposite direction. In addition, as the rotational speed of the stator 40 increases, the rotational speed of the rotor 30 gradually decreases. The controller maintains the slip frequency −fsa by changing the frequency fa in accordance with the change of the rotational speed of the rotor 30 and the stator 40. Consequently, the rotational force of the rotor 30 can be converted into the rotation of the stator 40 with high efficiency.

As described above, in the electric motors 80a, 80b of the present invention, the stator 40 is rotated and the rotational force Ki of the stator 40 is used for the rotation of the rotor 30 when rotating the rotor 30. Consequently, higher output Nc*T can be obtained compared to the conventional electric motor. In addition, in the operation range where the stator 40 is rotated, the counter electromotive force Ke or the inductive reactance XL applied to the coils 42 can be 0 or reduced. Consequently, the loss is reduced in the above described operation range, and the supply power can be efficiently used.

In addition, in the electric motors 80a, 80b of the present invention, the rotational force of the rotor 30 is accumulated as the rotational force of the stator 40 as the kinetic energy during the braking or the like, and the rotational force of the stator 40 is used for the rotation of the rotor 30 as the kinetic energy when restarting the vehicle, for example. Therefore, the energy loss is small and the kinetic energy of the rotor 30 and the stator 40 can be efficiently used at the maximum.

Furthermore, in the electric motors 80a, 80b of the present invention, when there is excess torque on the rotational force of the stator 40, the coils 42 generate electric power by an amount corresponding to the excess torque and the generated electric power is compensated as a part of the drive current. Consequently, the output of the drive current can be reduced. Thus, efficiency can be further increased and energy saving can be further achieved. Furthermore, in the electric motor 80b of the second embodiment, since the rotor 30 is rotated by the optimum slip frequency fsa, −fsa, unnecessary heat generation can be suppressed. Thus, a load applied to a cooling device or the like can be also reduced.

Note that the components such as the electric motors 80a, 80b, the rotor 30, the stator 40, the stator rotating mechanism 46 and the reverse rotation preventing units 16, 46b shown in the embodiments are merely examples. The present invention can be carried out while the shape, the dimension, the mechanism and the design of each component and the numbers of the coils 42 and the field magnets 32 can be changed within the range not departing from the scope of the present invention.

DESCRIPTION OF THE REFERENCE NUMERALS

10: output shaft, 12: bearing portion, 30: rotor, 32: field magnets, 36: rotor core, 16, 46b: reverse rotation preventing unit, 40: stator, 42: coil, 46: stator rotating mechanism, 50: ratchet gear, 52: hook portion, 80a, 80b: electric motor, M: driven body

The invention claimed is:
1. An electric motor, comprising:
an output shaft for transmitting a rotational force to a driven body;
a bearing portion for supporting the output shaft so as to be rotatable;
a rotor fixed to the output shaft;
a stator located outside the rotor; and
a plurality of coils provided on the stator, wherein
the rotor is configured to be rotated when a drive current flows through the plurality of coils,
the electric motor further comprising:
a stator rotating mechanism for supporting the stator so that the stator is rotatable in a same direction as the rotor, wherein
the rotational force of the rotor is converted into a rotation of the stator when a rotational speed of the rotor is reduced, and
the drive current is made to flow in a state that the stator is rotated so that the rotor is rotated by the rotational force of the stator in addition to the rotational force generated by the drive current.
2. The electric motor according to claim 1, wherein when the rotation of the stator exceeds a limitation torque of the rotor, the plurality of coils of the stator generates electric power by an amount exceeding the limitation torque so that a part of the drive current is compensated by a current generated by the electric power to reduce the drive current.
3. The electric motor according to claim 1, further comprising:
a reverse rotation preventing unit for preventing a reverse rotation of the rotor and the stator, wherein
the reverse rotation preventing unit includes: a ratchet gear fixed to the bearing portion; a first hook portion fixed to the rotor; and a second hook portion fixed to the stator so that the first hook portion and the second first hook portion are engaged with the ratchet gear,
the first hook portion and the second hook portion are configured to be separated from the ratchet gear and not in contact with the ratchet gear when the rotational speed exceeds a predetermined rotational speed.
4. The electric motor according to claim 1, wherein the drive current flowing through the plurality of coils is an alternate current,
the electric motor further comprising:
a rotor core provided on the rotor;
a stator frequency acquisition unit for acquiring a stator frequency from a number of rotation of the stator; and
a controller for controlling a frequency of the drive current, and
the controller controls the frequency so that the frequency becomes a predetermined slip frequency while the stator frequency is taken into consideration.
5. The electric motor according to claim 1, wherein the electric motor further comprising:
a plurality of field magnets provided on the rotor so that the plurality of field magnets faces the plurality of coils;
a position information acquisition unit for acquiring a relative position between the plurality of coils and the plurality of field magnets; and
a controller for controlling a flowing direction of the drive current flowing through the plurality of coils, wherein the plurality of field magnets is arranged at equal intervals so that magnetic poles are opposite to each other between neighboring field magnets, the controller controls a flowing direction of the drive current flowing through the plurality of coils based on the relative position between the plurality of coils and the plurality of field magnets acquired by the position information acquisition unit.

6. The electric motor according to claim 3, wherein the drive current flowing through the plurality of coils is an alternate current, the electric motor further comprising:

a rotor core provided on the rotor;

a stator frequency acquisition unit for acquiring a stator frequency from a number of rotation of the stator; and a controller for controlling a frequency of the drive current, and the controller controls the frequency so that the frequency becomes a predetermined slip frequency while the stator frequency is taken into consideration.

7. The electric motor according to claim 3, wherein the electric motor further comprising:

a plurality of field magnets provided on the rotor so that the plurality of field magnets faces the plurality of coils;

a position information acquisition unit for acquiring a relative position between the plurality of coils and the plurality of field magnets; and a controller for controlling a flowing direction of the drive current flowing through the plurality of coils, wherein the plurality of field magnets is arranged at equal intervals so that magnetic poles are opposite to each other between neighboring field magnets, the controller controls a flowing direction of the drive current flowing through the plurality of coils based on the relative position between the plurality of coils and the plurality of field magnets acquired by the position information acquisition unit.

* * * * *